United States Patent [19]
Lombardo, Sr.

[11] 3,779,503
[45] Dec. 18, 1973

[54] QUICK DETACHABLE SEAT FOR AUTOMOBILE

[76] Inventor: Joseph S. Lombardo, Sr., 13 Walnut St., North Brunswick, N.J. 08902

[22] Filed: May 5, 1972

[21] Appl. No.: 250,815

[52] U.S. Cl. ............................................. 248/429
[51] Int. Cl. ........................................... F16m 1/00
[58] Field of Search.................. 248/429, 430, 424, 248/420, 416, 393, 398, 23; 297/341, 344; 296/65 A, 65 R

[56] References Cited
UNITED STATES PATENTS

| | | | |
|---|---|---|---|
| 1,718,042 | 6/1929 | Hamsing | 248/393 |
| 2,631,800 | 3/1953 | Pinkston | 248/23 |
| 3,313,571 | 4/1967 | Ferrara | 296/65 R |
| 3,477,670 | 11/1968 | Sloyan | 248/23 |
| 3,601,350 | 8/1971 | Fry | 248/430 |

FOREIGN PATENTS OR APPLICATIONS

| | | | |
|---|---|---|---|
| 234,000 | 5/1925 | Great Britain | 248/429 |
| 329,442 | 5/1930 | Great Britain | 248/429 |
| 437,562 | 10/1935 | Great Britain | 248/429 |

Primary Examiner—Marion Parsons, Jr.
Attorney—Charles H. Recht

[57] ABSTRACT

A seat for automobiles is provided which may be moved longitudinally on a track and which has a track-engaging element which is confined to movement along the track; a support is fixed to the seat and releasably connected to the track-engaging element for quick release of the seat from the track system.

5 Claims, 3 Drawing Figures

PATENTED DEC 18 1973 3,779,503

QUICK DETACHABLE SEAT FOR AUTOMOBILE

BACKGROUND OF THE INVENTION

The present invention pertains to seat mountings for an automobile seat.

In order to accommodate drivers of different physical sizes, automobile seats are constructed so that they may be moved forwardly and rearwardly so as to bring the seat closer to or further from the dash board and the controls, such as accelerator, brake and steering wheel. Generally, there has been provided plural tracks which are parallel and which are secured to the floor or chassis of the automobile. Connected to the seat are means for engaging these floor-mounted tracks, which may comprise track-like structures slidable in the floor-mounted tracks. Some interengaging means between the track-engaging elements and the floor-mounted tracks are provided to prevent movement of the seat in any manner other than along the track, so as to prevent the seat from moving upwardly relative to the vehicle floor, as when the vehicle goes over bumps or rough ground. Such interengaging means comprises, for example, interengaging flanges, or pin and slot constructions. In addition, the conventional automobile seat constructions provide releasable locking devices so that once an adjusted position of the seat relative to the controls has been achieved, the seat is then firmly locked against movement.

While the conventional automobile seats as above described, of either the bench type, or the so-called "bucket seat" type have proven to be generally satisfactory during normal use, when the automobiles have been severaly damaged, as in a collision or roll-overs, a problem arises in that elements or structual members of the automobiles are broken or distorted, and pin or trap the driver and/or passenger(s) in the automobile. More particularly, the front seat is often much closer to the dash board and fire wall structure than normal, due to the distortion or breaking of various parts of the automobile.

In such accidents or roll-overs, it is often found that occupands of the automobile are injured and that for proper medical attention, they should be removed as quickly as possible from the damaged automobile. Rescue workers are not able to effect quick removal of the injured occupants in many cases, due to the necessity for first working on the automobile at great length and often with complex or unweildy equipment, in order to free the occupants from the automobile. Thus, rescue workers have had to resort to levers to attempt to bend distorted portions of the automobile, welding torches to sever parts of the automobile to permit occupant removal, and in some cases have had to laboriously disassemble nuts and bolts, and similar fastening elements with various tools. All such rescue efforts are time consuming, and in many cases the necessary tools or other equipment are not initially available at the scene, thus causing delays which are harmful to the injured occupants.

The prior art has not recognized this problem. Movable seats for automobiles have long been provided, as hereinabove noted, but these movable seats have not been readily detachable. In general, such seats have provided connecting elements such as rivets and pins with securing elements therefor which were difficult to remove, and which were often located in inaccessible places. Other fastening elements used have been of the screw-threaded type, which usually required two tools to be applied, as to a bolt head and a nut, and at least one of the tools had to be associated with the fastener in a difficult or inaccessible place. This was, of course, particularly true when the automobile had been damaged as above noted.

Removable seats have been provided for automobiles and other vehicles, but these have not been quickly detachable, nor have they been movable relative to the automobile controls, as is the case with the conventional movable automobile seats.

SUMMARY OF THE INVENTION

An automobile seat is provided which is movable relative to the automobile controls in normal manner, and which in addition is readily detachable, so that occupants may be removed from the automobile after the automobile has been damaged, as in a collision or other accident. A floor-mounted track or tracks is provided, and track-engaging means are also provided which are movable along the floor-mounted track, movement being limited to movement along the track in its direction. The seat has fixedly connected to it a seat support, and the seat support is connected to the track-engaging means by a releasable connection. Preferably, the releasable connection includes two connectors. A first, forward connector, comprises a female socket member on the track-engaging means or element which is rearwardly facing, together with a male socket member which is forwardly directed and which is on or forms a part of the seat support. The rear connector, which is the second connector, comprises a passage or bore through the seat support, and apertures in the track-engaging element, and a headed pin fastener extending through the passage and the apertures to thereby connect the seat support to the track-engaging element. Preferably, this headed pin connector is provided with a cotter key which may be removed by hand, after which the headed pin connector may also be removed by hand. This displacement or removal of the pin connector releases the rear connection between the seat support and the track-engaging element, and this permits disengagement of the male and female socket members, forming the first connector, after which the seat may be entirely detached from the vehicle.

Among the objects of the present invention are to provide a seat attachment construction for automobiles which is both shiftable in a front and rear direction, and which may be quickly detached for removal of occupants in the event of an accident. Another object of the present invention is the provision of a quick detachable connection for an automobile seat which is at an accessible place. A further object of the present invention is to provide a detachable seat construction for automobiles which may be readily and quickly removed or detached with fingers or simple hand tools. Yet another object of the present invention is the provision of a seat connecting construction having multi-point interconnection between parts to be disconnected, wherein release of one interconnection construction will permit release of the other(s) interconnection.

DESCRIPTION OF THE PREFERRED EMBODIMENT

Figure 1:
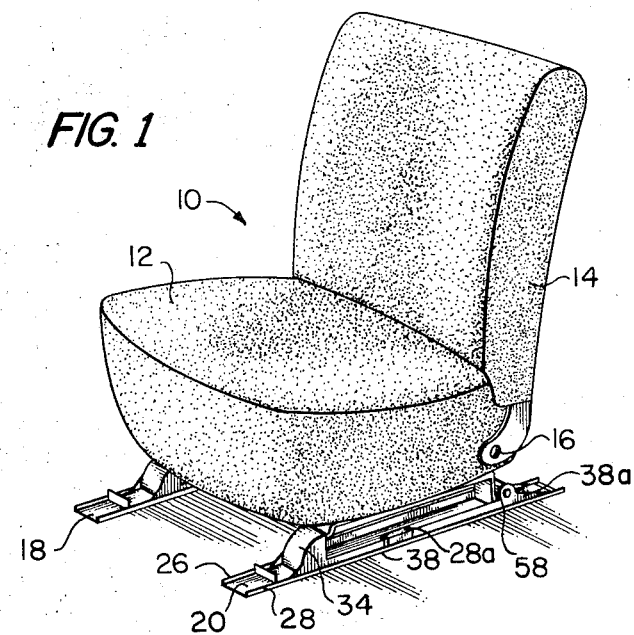
FIG. 1 is a perspective view of an automobile seat and detachable connection therefor in accordance with the present invention.

Referring now to the drawings, wherein like or corresponding reference numerals are used to designate like or corresponding parts throughout the several views, there is shown in FIG. 1 an automobile seat generally designated 10 and comprising a seat bottom 12 and a seat back 14 pivoted thereto at 16. The seat 10 is a so-called "bucket seat" but it will be understood that it may be instead a bench type seat, and also it will be understood that the seat 10 may be of the type in which the back is rigidly mounted in relation to the seat bottom.

Floor tracks 18 and 20 are provided, extending parallel to each other in linear fashion, so that they provide a track way for movement of the seat towards or from the automobile controls, or the plane thereof.

Figure 2:
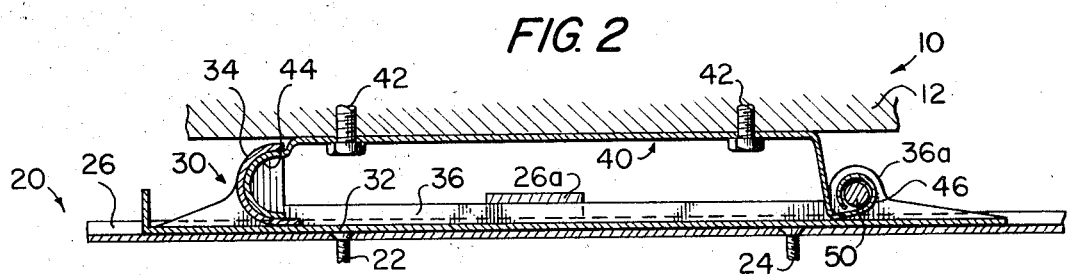
FIG. 2 is a cross sectional view taken along the line 2—2 of FIG. 1.
Figure 3:
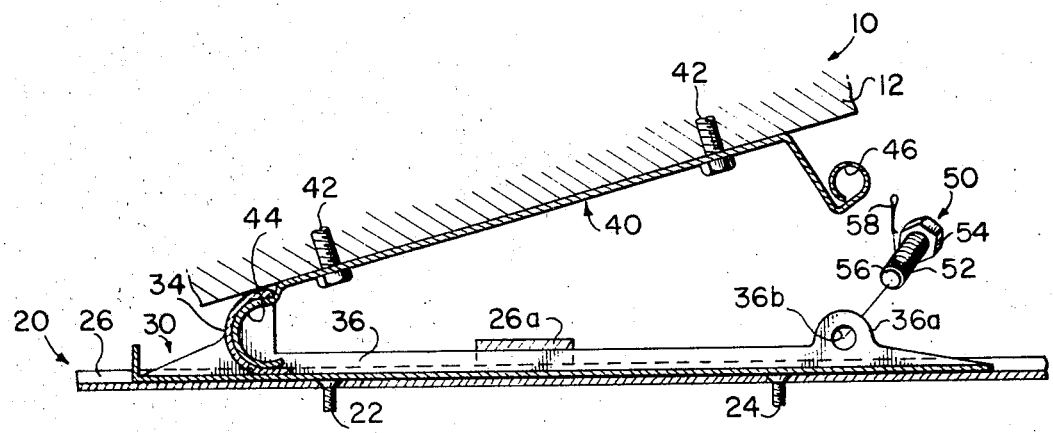
FIG. 3 is similar to FIG. 2, showing the seat being detached from the automobile.

As shown in FIGS. 2 and 3, the floor-engaging track 20 is firmly connected to the automobile floor or chassis, in conventional manner; for purposes of illustration, headed fastening elements 22 and 24 are shown in FIGS. 2 and 3 extending downwardly from the track 20 to thereby secure it in position on the floor of the vehicle. Track 20 may be seen to comprise a pair of upstanding flanges 26 and 28 (see also FIG. 1) the flange 26 having a generally horizontally extending lip 26a which overlies the bottom or channel portion of the track 20. Shown in FIG. 1 is a corresponding lip 28a which is in opposed facing relationship to the lip 26a and which also overlies the bottom portion or web of the channel 20.

A track-engaging member 30 is provided, which cooperatively engages the track 20, it being understood that the left hand and right hand structures as shown in FIG. 1 are essentially duplicative. The track-engaging member 30 is movable in track 20 in a linear manner, as is conventional, and comprises a bottom web 32 in engagement with the bottom web of the track 20. Near its front, the member 30 is provided with a female socket 34 which extends between flanges which extend upwardly from the web 32, in FIG. 2 there being shown the flange 36. The corresponding flange 38 may be seen in FIG. 1, and it will be understood that the flanges 36 and 38 of the member 30 are adjacent and inwardly of the flanges 26 and 28 of the track 20. The lip 26a overlies the top edge of the flange 36, and the lip 28a overlies the top edge of flange 38. This illustrative construction provides interengaging surfaces on the track 20 and the track-engaging member 30 which limit the relative movement therebetween to linear movement along the track 20, and prevents movement of the member 30 in a direction perpendicular to the floor, and upwardly therefrom. Naturally, the flanges 26 and 36 and 28 and 38, prevent lateral movement of the seat.

Near its rear end, the track-engaging member 30 is provided with an upstanding ear 36a on the flange 36, the ear 36a having an aperture 36b therein, as is shown in FIG. 3. In FIG. 1 there may be seen a corresponding ear 38a.

Fixed to the bottom of the seat bottom 12, as shown in FIG. 2, is a seat support, generally designated 40.

Suitable fasteners 42 pass through the seat support 40, and are connected to the structure of the seat bottom 12, as by a screw threaded connection. At its forward end, the seat support 40 is provided with a forwardly directed male socket member 44 which, as shown in FIG. 2, is engagingly received in the female socket 34 of the track-engaging member 30. At its rear end, the seat support 40 is provided with a transverse passage 46, and a fastener element 50 may be seen to extend through the aperture 36b (and the corresponding aperture in the ear 38a), and the passage 46. As shown in FIG. 3, the connector 50 preferably is in the form of a generally cylindrical pin portion 52 with head 54 and a transverse hole 56 in the pin portion 52. A conventional cotter key 58 is also shown in FIG. 3, having been removed from the hole 56.

The seat 10 is provided, as is conventional, with a means for locking it in any selected position relative to the dash board and/or control elements. Such a device is not shown herein for purposes of clarity, and because it forms no part of the present invention.

In use, the entire seat structure, except for the floor-mounted tracks 18 and 20 may be moved forwardly and rearwardly in conventional manner. In the event of an accident the cotter key 58 may be removed from the headed pin connector 50. Removal may be accomplished by hand, if the cotter key 58 has not been excessively bent, but bent only enough to prevent its accidental dislodgement from pin 50. Then the pin 50 may be removed, and this may also be accomplished by hand, although it will be understood that by the use of such simple hand tools as pliers and/or a hammer and/or a screw driver, such removal may be accomplished more quickly. As will be understood, the pin 50 and the parts associated with it are at a readily accessible place, so that it may be quickly reached, and quickly removed. After the pin 50 is removed, as shown in FIG. 3, the seat 10 may be rotated upwardly, and then moved backward or toward the rear, or it may simply be moved toward the rear, without being rotated. This will serve to disengage the front connection between the seat support 40 and the track engaging member 30, disengaging the male socket element 44 from the female socket element 34. Thereafter, the injured occupant or occupants may be readily removed, and quickly given needed medical attention.

There has been disclosed herein a seat construction for automobiles which provides for both conventional shifting of the automobile seat, and quick detachment of the automobile seat from the automobile itself. The detachable or removable elements forming a part of the herein disclosed structure are provided in an accessible position, and detachment or removal may be effected with fingers or simple hand tools. Further, the herein disclosed connection is a multi-point interconnection between elements, with release or removal of one element permitting or enabling release of the other interconnection between the elements, thereby providing both secure assemblage with quick detachability.

It will be obvious to those skilled in the art that various changes may be made without departing from the spirit of the invention and therefore the invention is not limited to what is shown in the drawings and described in the specification but only as indicated in the appended claims.

I claim:

1. A detachable seat for automobiles comprising:

a. a floor mounted linearly extending fixed track means,
b. movable track-engaging means cooperatively engaging said fixed track means for linear movement relative thereto,
c. interengaging means on said track-engaging means and said track means for limiting relative movement of said track-engaging means to linear movement along said track means,
d. a seat,
e. seat support means fixedly attached to said seat and engaging said track-engaging means, and
f. means for releasably connecting said support means to said track-engaging means comprising first and second connecting means between said support means and said track-engaging means, one said connecting means comprising a displaceable connector element having a locking position and a release position, said other connecting means comprising rearwardly facing female socket means on said track-engaging means and male socket means on said seat support means, said connector element preventing disengagement of said other connecting means while said connector element is in locking position.

2. The detachable seat of claim 1, said one connecting means comprising an aperture in said track-engaging means and a passage in said support means, said connector element comprising pin means extending through said aperture and said passage, and quick release means for securing said pin means in said position.

3. The detachable seat of claim 2, said quick release means comprising a cotter key.

4. The detachable seat of claim 1, and said connector element comprising removable pin means.

5. The detachable seat of claim 4, said pin means extending transversely of said track means.

* * * * *